(12) United States Patent
Chen et al.

(10) Patent No.: US 9,843,457 B2
(45) Date of Patent: Dec. 12, 2017

(54) METHOD AND SYSTEMS FOR MAINTAINING A PROXY MAPPING TABLE

(71) Applicant: MOTOROLA SOLUTIONS, INC., Chicago, IL (US)

(72) Inventors: Da-Jun Chen, Chengdu (CN); Xun Fei, Chengdu (CN); Yong Tian, Chengdu (CN); Jian-Xiang Wang, Chengdu (CN); Dong Zhao, Chengdu (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/507,293

(22) PCT Filed: Nov. 21, 2014

(86) PCT No.: PCT/CN2014/091954
§ 371 (c)(1),
(2) Date: Feb. 28, 2017

(87) PCT Pub. No.: WO2016/078097
PCT Pub. Date: May 26, 2016

(65) Prior Publication Data
US 2017/0279627 A1 Sep. 28, 2017

(51) Int. Cl.
*H04W 4/00* (2009.01)
*H04L 12/28* (2006.01)
*H04W 60/00* (2009.01)
*H04W 88/04* (2009.01)

(52) U.S. Cl.
CPC ............ *H04L 12/28* (2013.01); *H04W 60/00* (2013.01); *H04W 88/04* (2013.01)

(58) Field of Classification Search
CPC ..................................................... H04L 12/28
USPC ...................................................... 455/435.1
See application file for complete search history.

(56) References Cited

U.S. PATENT DOCUMENTS

| 6,230,012 | B1 | 5/2001 | Willkie et al. |
| 7,809,381 | B2 | 10/2010 | Aborn et al. |
| 8,561,143 | B2 | 10/2013 | Cope et al. |
| 8,649,786 | B2 | 2/2014 | Casati et al. |

(Continued)

FOREIGN PATENT DOCUMENTS

WO 2012012109 A1 1/2012

OTHER PUBLICATIONS

The International Search Report and the Written Opinion, corresponding patent application No. PCT/CN2014/091954, filed: Nov. 21, 2014, all pages.

*Primary Examiner* — Joel Ajayi

(57) ABSTRACT

In at least one embodiment, a radio access network (RAN) device maintains a proxy mapping table (PMT) of any mobile radios that are currently registered with the RAN via a mobile subscriber unit (MSU). The PMT indicates, for each mobile radio listed in the PMT, the particular MSU via which that particular mobile radio is registered with the RAN. The RAN device receives a first service request for a first mobile radio that is listed in the PMT as being registered with the RAN via a first MSU and, in response to receiving the first service request, makes a determination that an air-interface link is available for communication between the RAN and the first MSU. In response to making the determination, the RAN device communicates the first service request via the available air-interface link to the first MSU for delivery to the first mobile radio.

18 Claims, 11 Drawing Sheets

(56) References Cited

U.S. PATENT DOCUMENTS

| | | |
|---|---|---|
| 8,737,579 B2 | 5/2014 | Johnson et al. |
| 2003/0156552 A1 | 8/2003 | Banker et al. |
| 2005/0249218 A1 | 11/2005 | Biggs et al. |
| 2007/0260674 A1 | 11/2007 | Shenfield |
| 2011/0105131 A1 | 5/2011 | Shaheen |
| 2011/0131082 A1 | 6/2011 | Manser et al. |
| 2012/0005276 A1 | 1/2012 | Guo et al. |

| MOBILE RADIO *550* | MSU *552* | FNE *1050* |
|---|---|---|
| 504 | 502 | 1002 |
| 506 | 502 | 1002 |
| 210 | 208 | 206 |
| 212 | 208 | 206 |
| 214 | 208 | 206 |

520 ↗

METHOD AND SYSTEMS FOR MAINTAINING A PROXY MAPPING TABLE

BACKGROUND OF THE INVENTION

Wireless-communication devices (hereinafter "mobile radios") such as cell phones, smart phones, and mobile Wi-Fi hotspots are generally configured with the ability to obtain one or more types of wireless service. Such service could take the form of telephony service and/or data service (e.g., Internet connectivity), among other forms of service. These services are typically obtained via a radio access network (RAN). Well known examples of such RANs include Association of Public-Safety Communications Officials-International (APCO) Project 25 (P25) networks, Terrestrial Trunked Radio (TETRA) networks, Long-Term Evolution (LTE) networks, Global System for Mobile Communications (GSM) networks, CDMA2000 networks, and IEEE 802.11 (Wi-Fi) networks, among numerous other examples.

A mobile subscriber unit (MSU) that is within the coverage area of a RAN may act as a repeater for mobile radios that are outside of the RAN's coverage area, and thus may allow those mobile radios to register with the RAN. Changes to the registration status of an MSU may affect the registration status of any mobile radios that are registered with the RAN via the MSU, and changes to the registration status of a mobile radio may affect the registration status of any MSU via which that mobile radio is registered with the RAN. Accordingly, there is a need for maintaining a proxy mapping table (PMT).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 5-6 and 8-11 respectively depict various states of a proxy mapping table (PMT), in accordance with at least one embodiment.

Figure 1:
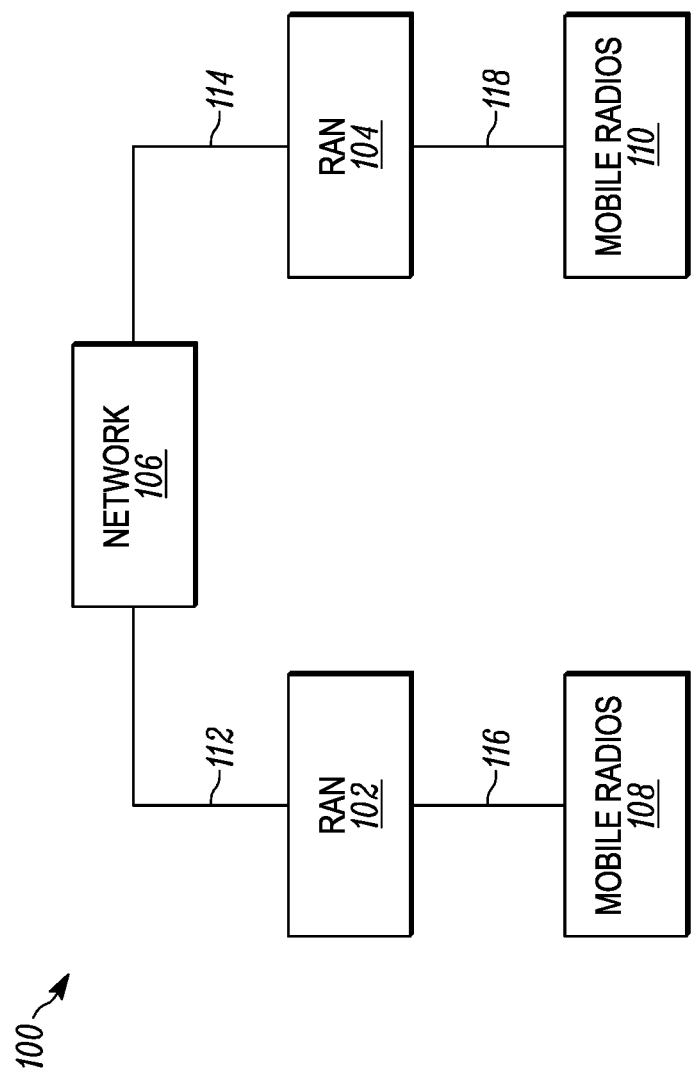
FIG. 1 depicts a communication system, in accordance with at least one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and systems for maintaining a PMT. At least one embodiment takes the form of a process carried out by a RAN device in a RAN. The RAN device maintains a PMT of any mobile radios that are currently registered with the RAN via an MSU. The PMT indicates, for each mobile radio listed in the PMT, the particular MSU via which that particular mobile radio is registered with the RAN. The RAN receives a first service request for a first mobile radio that is listed in the PMT as being registered with the RAN via a first MSU and, in response to receiving the first service request, makes a determination that an air-interface link is available for communication between the RAN and the first MSU. In response to making the determination, the RAN communicates the first service request via the available air-interface link to the first MSU for delivery to the first mobile radio.

In at least one embodiment, the RAN takes the form of (or includes) an APCO P25 network.

In at least one embodiment, maintaining the PMT includes receiving a radio-registration request from the first mobile radio via the first MSU. The radio-registration request indicates that the first mobile radio is attempting to register with the RAN via the first MSU. In response to receiving the radio-registration request, the RAN device registers the first mobile radio with the RAN at least in part by adding the first mobile radio to the PMT such that the PMT indicates that the first mobile radio is registered with the RAN via the first MSU.

In at least one such embodiment, registering the first mobile radio with the RAN also includes making a determination that the first MSU is registered with the RAN and responsively registering the first mobile radio with the RAN.

In at least one such embodiment, the radio-registration request includes a unique identifier of the first MSU, and making the determination that the first MSU is registered with the RAN includes making a determination that the unique identifier of the first MSU is listed in at least one of a Home Location Register (HLR) and a Visitor Location Register (VLR).

In at least one other such embodiment, the radio-registration request includes a unique identifier of the first mobile radio, and adding the first mobile radio to the PMT includes making a determination that the unique identifier of the mobile radio is listed in at least one of an HLR and a VLR). In response, the RAN device adds the unique identifier of the first mobile radio to the PMT.

In at least one embodiment, maintaining the PMT includes receiving a radio-deregistration request from the first MSU. In response to receiving the radio-deregistration request from the first MSU, the RAN device makes a determination that the PMT indicates that the first mobile radio is registered with the RAN via the MSU and responsively removes the first mobile radio from the PMT.

In at least one embodiment, maintaining the PMT includes receiving a radio-deregistration request from the first mobile radio. In response to receiving the radio-deregistration request from the first mobile radio, the RAN device makes a determination that the first mobile radio is listed in the PMT and responsively removes the first mobile radio from the PMT.

In at least one embodiment, the PMT further indicates, for each mobile radio listed in the PMT, a particular fixed network entity (FNE) via which the particular MSU is registered with the RAN. The first MSU is initially registered with the RAN via a first FNE. In at least one such embodiment, maintaining the PMT includes receiving an MSU-reregistration request from the first MSU. The MSU-reregistration request indicates that the first MSU is attempting to reregister with the RAN via a second FNE. In response to receiving the MSU-reregistration request from the first MSU, the RAN device makes a determination that the PMT indicates that the first mobile radio is registered with the RAN via the first MSU and responsively updates the PMT to indicate that the first mobile radio is registered with the RAN via the second FNE.

In at least one embodiment, the service request takes the form of (or includes) a request to establish a call with the first mobile radio.

In at least one embodiment, receiving the first service request for the first mobile radio that is listed in the PMT as being registered with the RAN via the first MSU includes receiving the first service request for the first mobile radio and responsively making a determination that the first mobile radio is listed in the PMT as being registered with the RAN via the first MSU.

In at least one embodiment, making the determination that the air-interface link is available for communication between the RAN and the first MSU includes making a determination that the air-interface link is established between the RAN and the first MSU.

In at least one embodiment, making the determination that the air-interface link is available for communication between the RAN and the first MSU includes making a determination that no mobile radios that are listed in the PMT as being registered with the RAN via the first MSU are engaged in a call.

In at least one embodiment, making the determination that the air-interface link is available for communication between the RAN and the first MSU includes making a determination that the first MSU is not engaged in a call.

In at least one embodiment, the RAN device receives a second service request for the first mobile radio from a given network entity. In response to receiving the second service request, the RAN device makes the determination that the air-interface link is not available for communication between the RAN and the first MSU, and responsively sends a rejection of the second service request to the given network entity.

In at least one embodiment, the air-interface link takes the form of (or includes) a half-duplex link. In at least one such embodiment, the half-duplex link takes the form of (or includes) a simplex link.

In at least one embodiment, the first MSU takes the form of (or includes) a mobile radio.

In at least one embodiment, the first MSU takes the form of (or includes) a repeater for facilitating communication between the first mobile radio and the RAN.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . ." And it is for reasons akin to brevity and clarity of presentation that this implied leading clause is not repeated ad nauseum in this detailed description.

FIG. 1 depicts a communication system, in accordance with at least one embodiment. As shown, a communication system 100 includes RANs 102 and 104, a network 106, and mobile radios 108 and 110.

Mobile radios 108 and 110 may be any suitable computing and communication devices configured to engage in wireless communication with one or more RANs (such as RANs 102 and 104, respectively) via one or more communication links (such as communication links 116 and 118, respectively), as is known to those in the relevant art. Any of mobile radios 108 and/or 110 could take the form of a mobile phone, a smartphone, a tablet computer, a walkie-talkie, a portable hotspot, an MSU, and/or any combination of these, among numerous other possibilities, and could be handheld (as may be the case for a walkie-talkie), body-mounted, or attached to a vehicle (such as the roof of a car), as examples. Moreover, any of mobile radios 108 and/or 110 may include a respective user interface (including elements such as a touchscreen, keyboard, microphone, speakers, and the like) via which a user may interact with the respective mobile radio.

It is explicitly noted that mobile radios that communicate via one or more RANs may also be capable of communicating directly with one another. Thus, while mobile radios that are capable of engaging in communication via one or more RANs could certainly carry out and embody one or more of the disclosed methods and systems, mobile radios that are capable of both direct-mode and RAN-based communication could certainly carry out and embody the present methods and systems as well.

RAN 102 and/or 104 could be any RAN equipped and configured by those of skill in the relevant art to function as described herein. In different embodiments, either (or both) of RANs 102 and 104 could take the form of (or include) a base station, a RAN, a subpart of a RAN, and/or a wireless wide area network (WWAN), as a few representative examples. RAN 102 and/or 104 could be controlled by different network operators, or by a common network operator. Either or both of RANs 102 and 104 could take the form of respective public-safety radio networks. In an embodiment, RAN 102 is a public-safety radio network and RAN 104 is a commercial radio network. And certainly numerous other possible implementation examples could be listed here.

In the embodiment illustrated in FIG. 1, RANs 102 and 104 are communicatively connected via respective communication links 112 and 114 to network 106, which could take the form of or include a circuit-switched network (such as the Public Switched Telephone Network (PSTN)), a packet-switched network (such as the Internet), and/or any other suitable network or networks.

Communication links 112-118 could include one or more communication devices, networks, connections, switches, bridges, routers, and the like. Any of communication links 112-118 could make use of wired and/or wireless forms of communication. Moreover, one or more communication links instead of and/or in addition to communication links 112-118 could be present.

Figure 2:
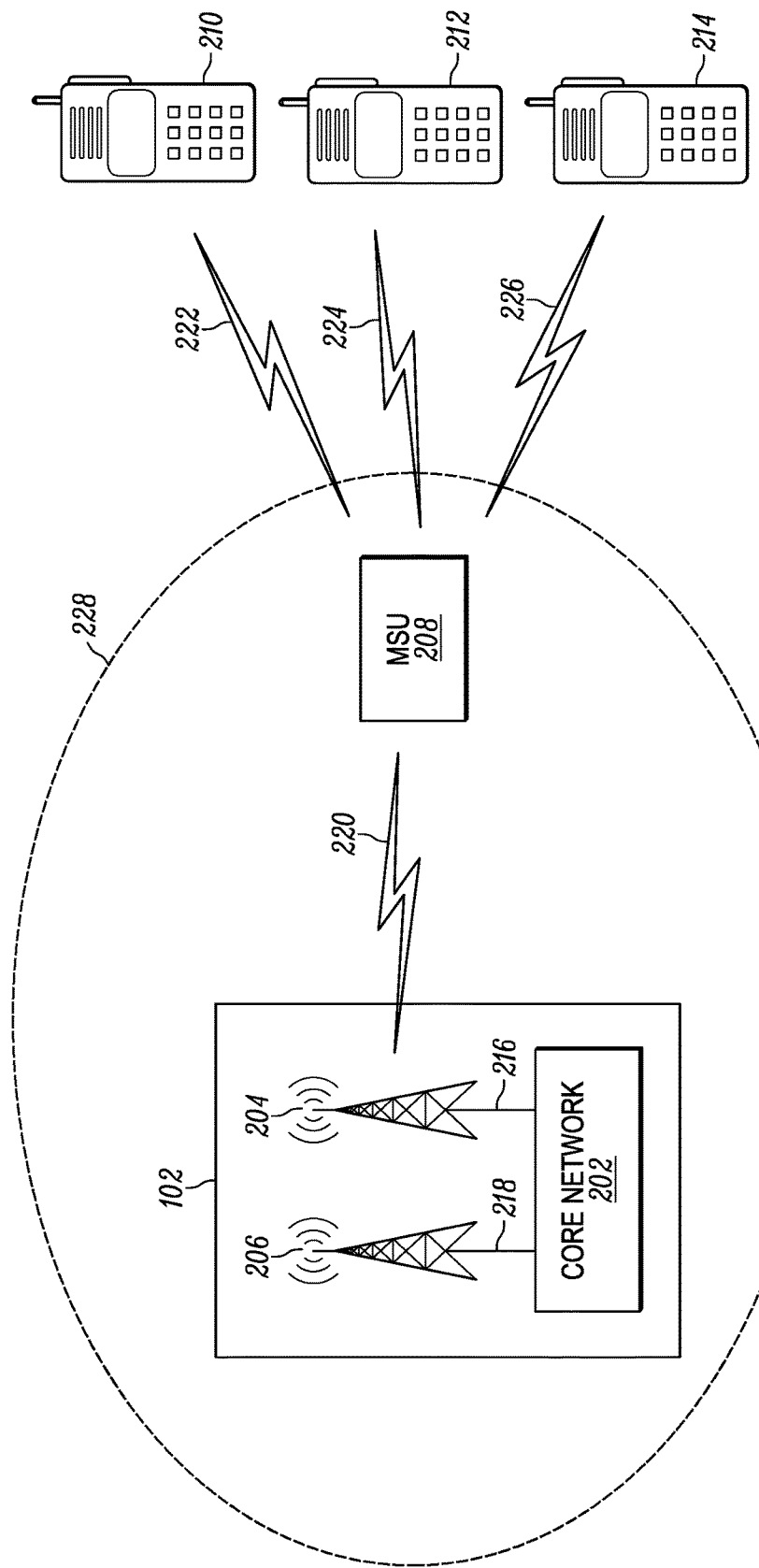
FIG. 2 depicts a radio access network (RAN), in accordance with at least one embodiment.

FIG. 2 depicts an example of RAN 102, in accordance with at least one embodiment. As shown, RAN 102 includes a core network 202, which communicates directly or indirectly with base stations 204 and 206 over respective communication links 216 and 218. As is the case with each of the links mentioned above, and as is the case with any of the communication links mentioned anywhere else in this disclosure, communication links 216-218 may take the form of (or include) one or more wireless-communication links and/or one or more wired-communication links, as deemed suitable by those of skill in the relevant art in a given context.

In general, base stations 204 and 206 may be any entities that, on one side (i.e., the wireless-network side (interface)), engage in wireless communication over respective air interfaces with one or more mobile radios according to a protocol (several examples of which are described throughout this detailed description) and, on the other side (i.e., the "backhaul" side), engage in communication with core network 202 via one or more respective communication links 216 and 218, to facilitate communications between various mobile radios (such as MSU 208 and/or mobile radios 210-214) and various networks and/or network entities (such as RAN 104 and/or network 106, among other examples).

In at least one embodiment, base station 204 includes any hardware and/or software necessary for the base station to function as a NodeB, an eNodeB, a base transceiver station (BTS), a Wi-Fi access point, and/or any other type of base station, as known to those having skill in the relevant art. In some instances, base station 204 may also include functionality typically associated in the art with entities that are often referred to by terms such as base station controllers (BSCs), radio network controllers (RNCs), and the like. Base station 204 may provide wireless service to mobile radios (e.g., MSU 208) that are within a coverage area 228 of base station 204. Base station 206 may take a form similar to that of base station 204, and additional and/or fewer base stations may be present in some embodiments.

Core network 202 may include one or more network entities such as one or more mobility management entities (MMEs), one or more serving gateways (SGWs), one or more packet data network (PDN) gateways (PGWs), one or more evolved packet data gateways (ePDGs), one or more home subscriber servers (HSSs), one or more access network discovery and selection functions (ANDSFs), and/or one or more other entities deemed suitable for a given implementation by those of skill in the relevant art. Moreover, these entities may be configured and interconnected in a manner known to those of skill in the relevant art to provide wireless service to mobile radios 210-214 via base stations 204 and 206, and to bridge such wireless service with various transport networks. In general, RAN 102 may provide wireless service according to a protocol such as P25, TETRA, LTE, GSM, CDMA2000, Wi-Fi, and/or the like. In at least one embodiment, RAN 102 takes the form of (or includes) a P25 network. These examples are provided for illustration and not by way of limitation; moreover, those of skill in the relevant art are aware of variations among different protocols and among different implementations of a given protocol, and of similarities across different protocols.

MSU 208 may take the form of (or include), for example, a vehicle-mounted mobile radio, though those of skill in the art will appreciate that MSU 208 may take the form of (or include) any type of mobile radio. MSU 208 may include a repeater for facilitating communication between RAN 102 (e.g., via an air-interface link 220) and one or more of mobile radio 210-214 (e.g., via respective air-interface links 222-226) which, as depicted in FIG. 2, may be outside of coverage area 228 of base station 204.

Air-interface links 220-226 may each include a respective downlink and a respective uplink. Any one or more of the downlinks and/or uplinks may take the form of respective air-interface channels and could be modulated using TDMA, FDMA, and/or Quadrature Phase-Shift Keying (QPSK), among numerous other examples known to those of skill in the relevant art. A respective downlink channel could (though need not) take the form of a shared channel, and could provide one or more of a circuit-mode-data service, a packet-mode-data service, and/or a Short Data Service (SDS) (i.e., a Short Message Service (SMS)), among numerous other examples known to those of skill in the relevant art. Communication over a given channel may be addressed to a single mobile radio using an identifier uniquely associated with that single mobile radio and/or to multiple mobile radios (e.g., in a manner similar to that described above with respect to direct-mode communication). In at least one embodiment, air-interface link 220 takes the form of (or includes) a half-duplex link (e.g., a simplex link).

Figure 3:
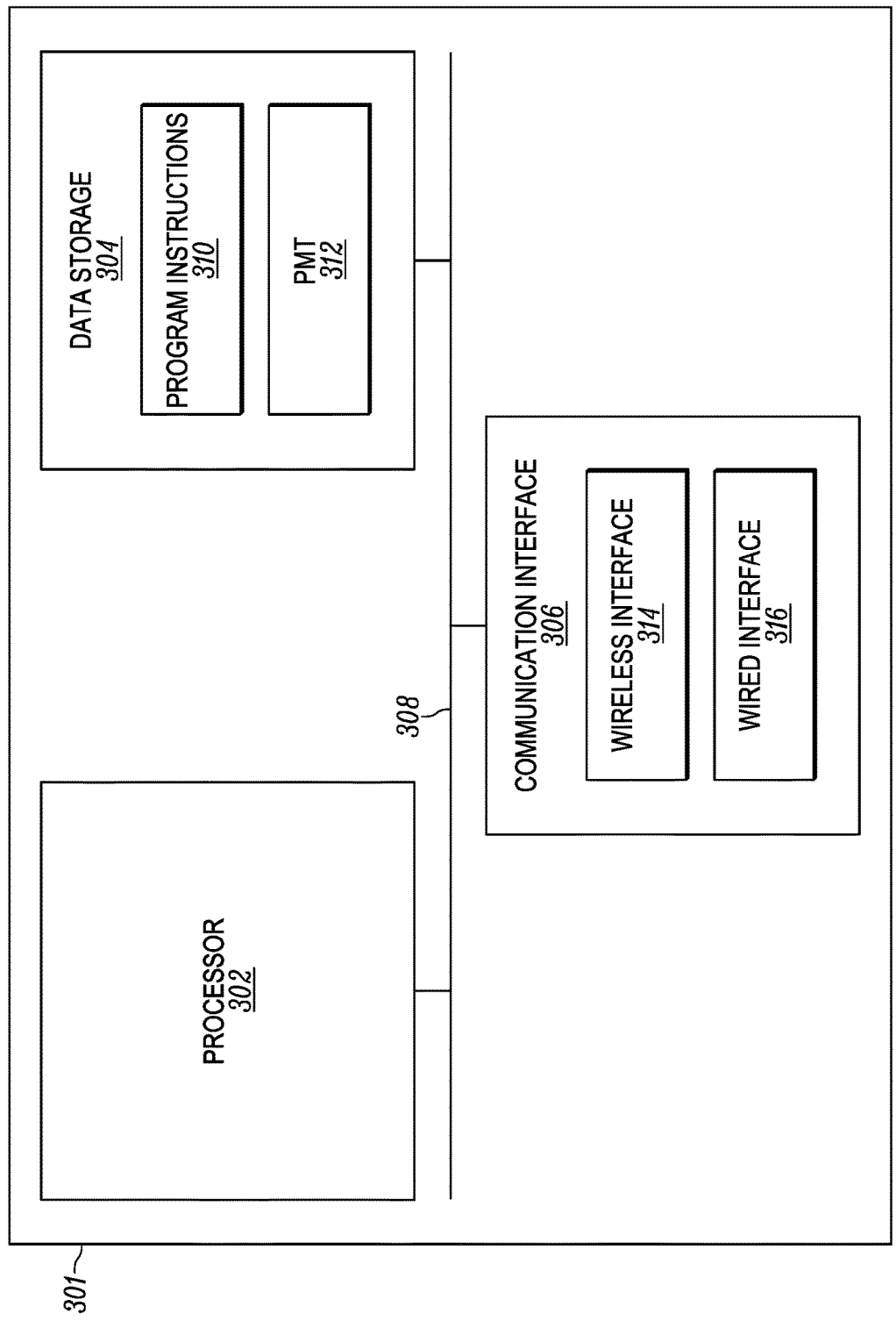
FIG. 3 depicts example structural elements of an example RAN device, in accordance with at least one embodiment.

FIG. 3 depicts example structural elements of an example RAN device 301, in accordance with at least one embodiment. As shown, the example RAN device 301 includes a processor 302, data storage 304, and a communication interface 306, each of which are interconnected via a system bus 308. Those having skill in the relevant art will appreciate that the example RAN device 301 could have additional and/or different components, and perhaps a different arrangement of components, among many other possible variations that could be listed here, and that any of mobile radios 210-214, MSU 208, any one or more entities within the RAN 102 (such as core network 202, base station 204, and/or base station 206), and/or any other network entities could take a form similar to that of RAN device 301 as depicted in FIG. 3. RAN device 301 may be a single device located within RAN 102, such as in the core network 202 or at one of the base stations 204 or 206, or may take the form of a distributed computing device whose functionality is divided across multiple discrete devices within RAN 102. In still further embodiments, RAN device 301 may be located in one of the external networks set forth above, such as the Internet, and may be accessible via RAN 102. And certainly other possible implementations could be listed here as well.

Processor 302 may include one or more processors of any type deemed suitable by those of skill in the relevant art, some examples including a microprocessor and a dedicated digital signal processor (DSP).

Data storage 304 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 3, data storage 304 contains program instructions 310 executable by processor 302 for carrying out various functions, though data storage 304 may contain different and/or additional data such as a PMT 312, among other possibilities. PMT 312 could be stored by an entity other than RAN device 301 in a manner so as to be accessible to RAN device 301.

In an embodiment in which RAN device 301 is configured to carry out one or more processes and/or functions (such as the processes and functions described with reference to FIG. 4), program instructions 310 are executable by processor 302 for carrying out those functions. In instances where other entities described herein have a structure similar to that of RAN device 301 as described in connection with at least FIG. 3, the respective program instructions 310 stored by the respective data storages 304 of those respective devices are executable by their respective processors 302 to carry out functions performed by those devices.

Communication interface 306 (including wireless communication interface 314 and/or wired communication interface 316) may include any necessary hardware (e.g., chipsets, antennas, Ethernet cards, etc.), any necessary firmware, and/or any necessary software for conducting one or more forms of communication with one or more other components and/or entities (such as mobile radios 210-214 and/or MSU 208, as examples).

Wireless communication interface 314 may be configured to communicate according to one or more of the wireless-communication types and/or protocols mentioned above, and/or one or more other types and/or protocols deemed suitable by those having skill in the relevant art for a given implementation or in a given context. Similarly, wired communication interface 316 may be configured to communicate according to one or more communication types and/or protocols such as Ethernet, Universal Serial Bus (USB), and the like, and/or one or more other types and/or protocols deemed suitable by those having skill in the relevant art for a given implementation or in a given context. Though communication interface 306 is depicted as including both a wireless communication interface 314 and a wired communication interface 316, those of skill in the art will appreciate that communication interface 306 may contain different and/or additional communication interfaces. For example, an embodiment of communication interface 306 could include only wireless communication interface 314 (and not wired communication interface 316).

Figure 4:
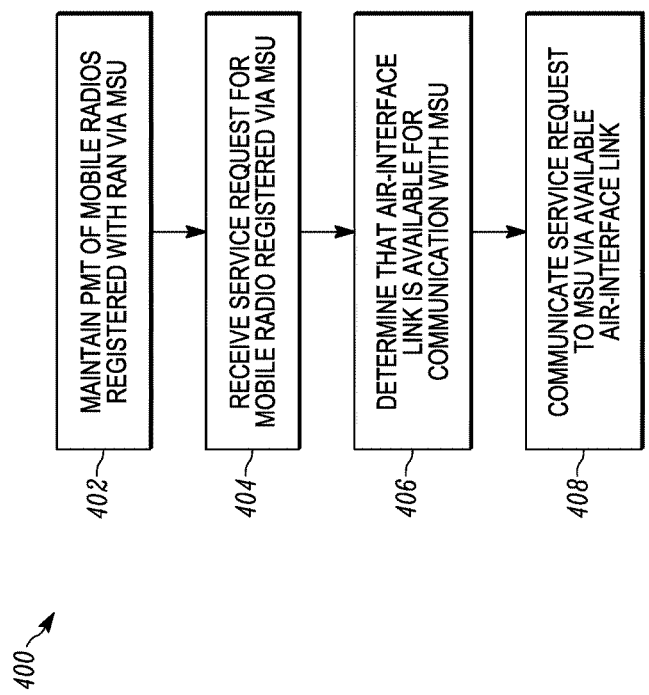
FIG. 4 depicts a flowchart of a process, in accordance with at least one embodiment.

FIG. 4 depicts a flowchart of a process 400, in accordance with at least one embodiment. Though process 400 is described as being carried out by RAN device 301, those of skill in the art will appreciate that the process may be carried out by any other suitable entity or combination of entities.

As shown, process 400 begins at step 402 with RAN device 301 maintaining a PMT of any mobile radios that are currently registered with RAN 102 via an MSU. The PMT indicates, for each mobile radio listed in the PMT, the particular MSU via which that particular mobile radio is registered with RAN 102.

Figure 5:
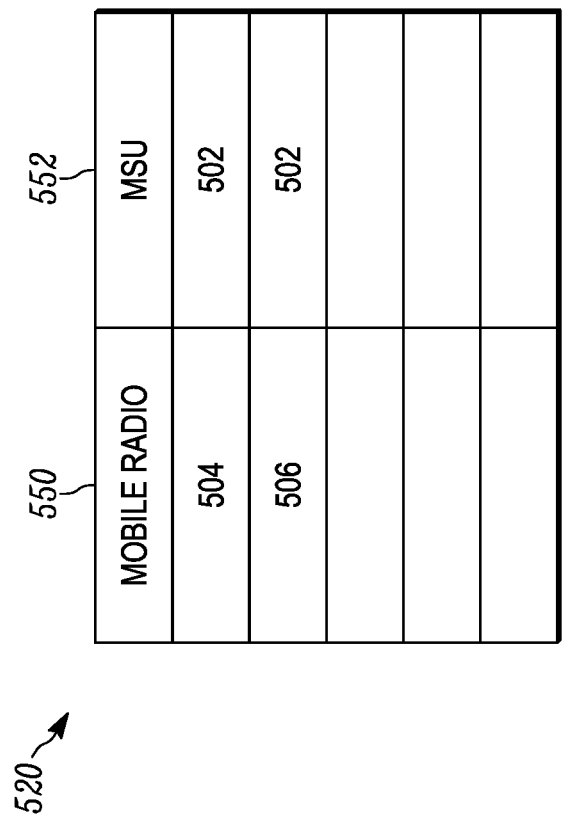

FIG. 5 depicts a first state 500 of a PMT 520, in accordance with at least one embodiment. As shown, PMT 520 includes a column 550 that indicates the mobile radios (if any) that are registered with RAN 102 via an MSU, and a column 552 that indicates the respective MSUs via which the mobile radios (indicated in column 550) are registered with RAN 102. Those of skill in the art will appreciate that PMT 520 could take other forms as well. At the state 500 of PMT 520 that is depicted in FIG. 5, mobile radios 504 and 506 are registered with RAN 102 via an MSU 502.

In at least one embodiment, maintaining PMT 520 includes receiving a radio-registration request from mobile radio 210 via MSU 208. The radio-registration request indicates that mobile radio 210 is attempting to register with RAN 102 via MSU 208. In response to receiving the radio-registration request, RAN device 301 registers mobile radio 210 with RAN 102 at least in part by adding mobile radio 210 to PMT 520 such that PMT 520 indicates that mobile radio 210 is registered with RAN 102 via MSU 208.

Figure 6:
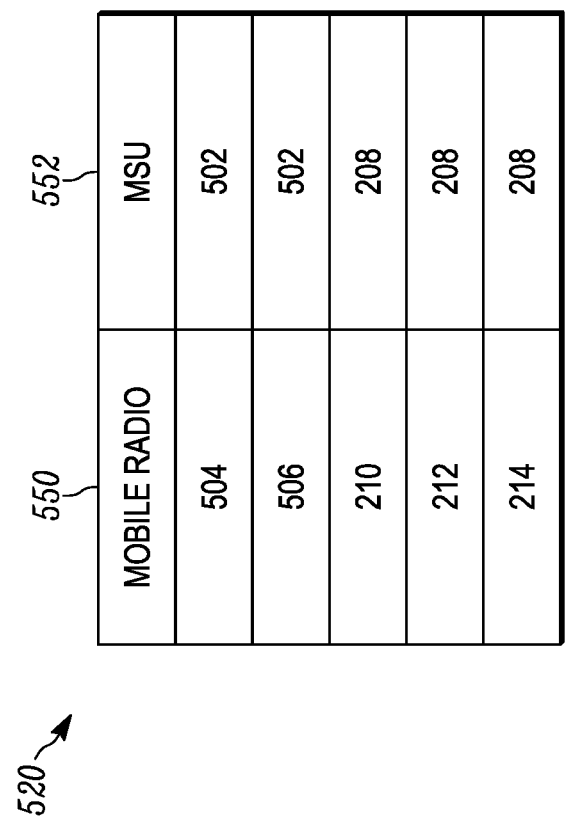

FIG. 6 depicts a second state 600 of PMT 520 subsequent to RAN device 301 receiving respective radio-registration requests from mobile radios 210-214 via MSU 208, in accordance with at least one embodiment. As shown, at state 600, RAN device 301 has added mobile radios 210-214 to PMT 520 such that PMT 520 indicates that mobile radios 210-214 are registered with RAN 102 via MSU 208.

Registering mobile radio 210 with RAN 102 may involve making a determination that MSU 208 is registered with RAN 102 and responsively registering mobile radio 210 with RAN 102. In at least one embodiment, the radio-registration request received from mobile radio 210 includes a unique identifier of MSU 208, and making the determination that MSU 208 is registered with RAN 102 includes making a determination that the unique identifier of MSU 208 is listed in at least one of an HLR and a VLR.

In at least one embodiment, the radio-registration request includes a unique identifier of mobile radio 210, and RAN device 301 adds mobile radio 210 to PMT 520 in response to making a determination that the unique identifier of mobile radio 210 is listed in at least one of the HLR and the VLR.

Figure 7:
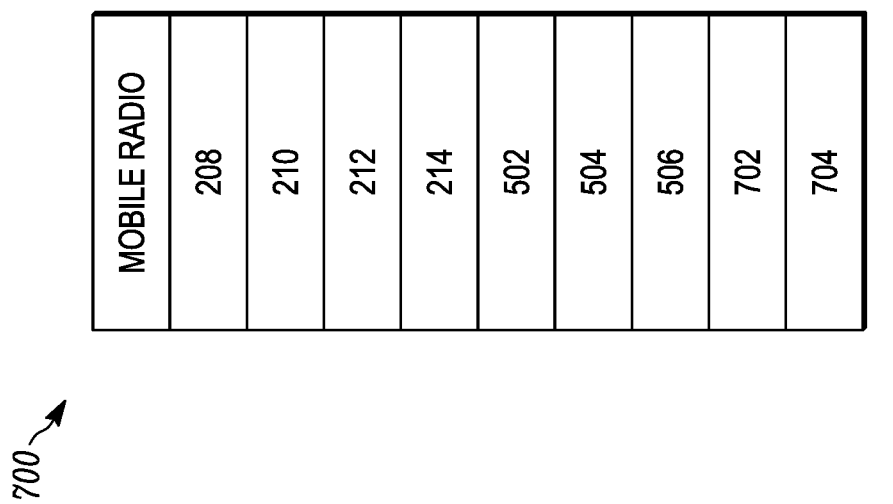
FIG. 7 depicts a Home Location Register (HLR), in accordance with at least one embodiment.

FIG. 7 depicts an HLR 700, in accordance with at least one embodiment. As shown, HLR 700 lists MSU 208 and mobile radios 210-214,502-506, and 702-704. In the illustrated embodiment, the unique identifiers of the mobile radios listed in HLR 700 are the respective reference numerals of the mobile radios. Those of skill in the art will appreciate that HLR 700 may take other forms as well without departing from the scope of the claims, and that a VLR may take a form similar to that of HLR 700.

In at least one embodiment, maintaining PMT 520 includes RAN device 301 receiving a radio-deregistration request from MSU 208. In response to receiving the radio-deregistration request from MSU 208, RAN device 301 makes a determination that PMT 520 indicates that mobile radio 210 is registered with RAN 102 via MSU 208 and responsively removes mobile radio 210 from PMT 520.

Figure 8:
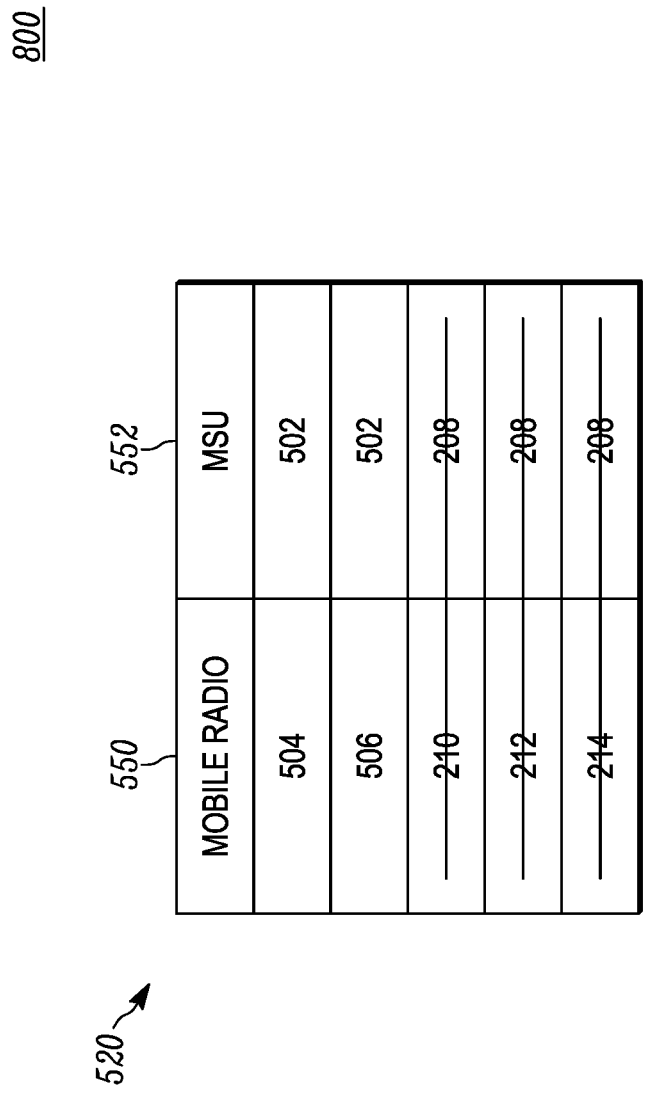

FIG. 8 depicts a third state 800 of PMT 520 subsequent to RAN device 301 receiving a radio-deregistration request from MSU 208. As shown, at state 800, RAN device 301 has removed mobile radio 210 from PMT 520, and has also removed mobile radios 212-214 from PMT 520 (subsequent to determining that PMT 520 had indicated that mobile radios 212-214 were registered with RAN 102 via MSU 208).

In at least one embodiment, maintaining PMT 520 includes RAN device 301 receiving a radio-deregistration request from mobile radio 210. In response to receiving the radio-deregistration request from mobile radio 210, RAN device 301 makes a determination that mobile radio 210 is listed in PMT 520 and responsively removes mobile radio 210 from PMT 520.

Figure 9:
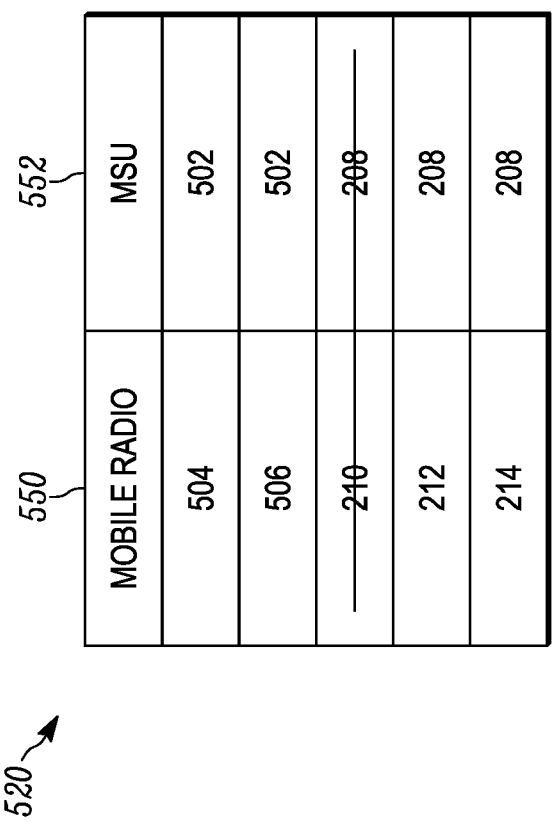

FIG. 9 depicts a fourth state 900 of PMT 520 subsequent to RAN device 301 receiving a radio-deregistration request from mobile radio 210. As shown, at state 900, RAN device 301 has removed mobile radio 210 from PMT 520. PMT 520 still indicates that mobile radios 212 and 214 are registered with RAN device 301 via MSU 208. States 800 and 900 represent alternative states that could follow from state 700.

In at least one embodiment, PMT 520 further indicates, for each mobile radio listed in PMT 520, a particular FNE via which the particular MSU is registered with RAN 102. The FNE could take the form of (or include) a base station (such as base station 204 and/or 206), a BTS, and/or a BSC, among other possibilities.

Figure 10:
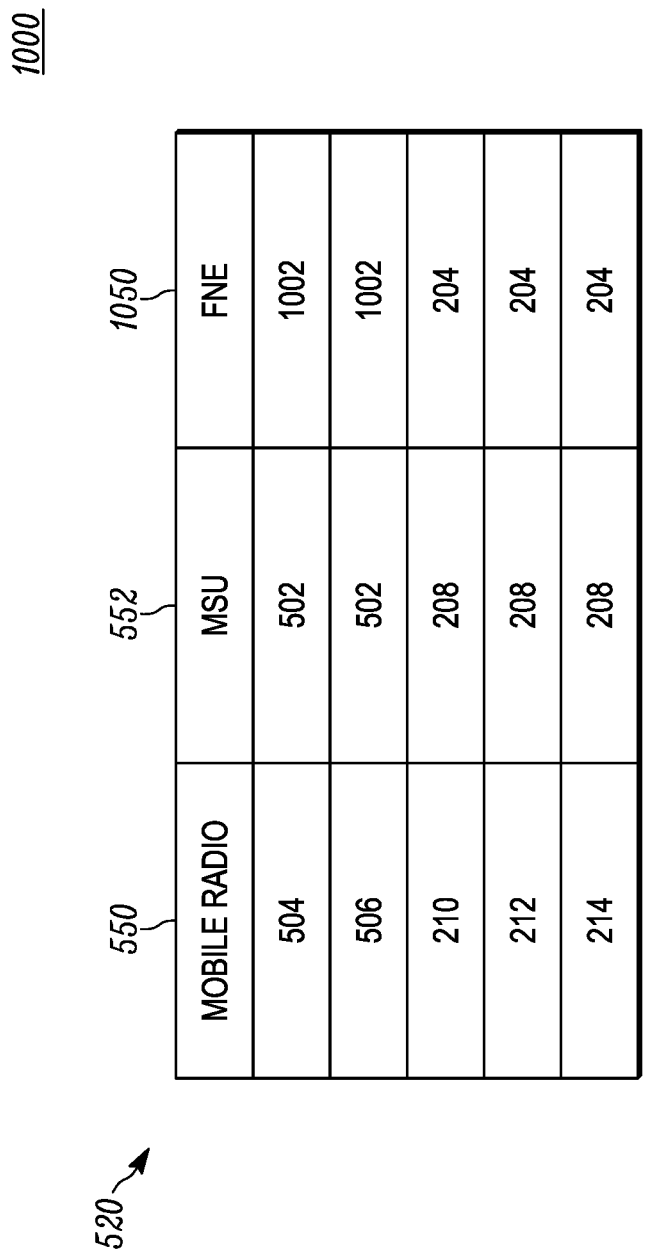

FIG. 10 depicts a fifth state 1000 of PMT 520 that further indicates the particular FNEs via which the particular MSUs are registered with RAN 102. As shown, a column 1050 indicates the particular MSU via which the MSUs indicated in column 552 are registered with RAN 102. At state 1000 of PMT 520, mobile radios 504 and 506 are registered with RAN 102 via MSU 502 that is in turn registered with RAN 102 via an FNE 1002, and mobile radios 210-214 are registered with RAN 102 via MSU 208 that is in turn registered with RAN 102 via FNE (i.e., base station) 204.

In an embodiment, MSU 208 is initially registered with RAN 102 via FNE (i.e., base station) 204, and maintaining PMT 520 includes RAN device 301 receiving, from MSU 208, an MSU-reregistration request that indicates that MSU 208 is attempting to reregister with RAN 102 via FNE (i.e. base station) 206. In response to receiving the MSU-reregistration request from MSU 208, RAN device 301 makes a determination that PMT 520 indicates that mobile radio 210 is registered with RAN 102 via MSU 208, and responsively updates PMT 520 to indicate that mobile radio 210 is registered with RAN 102 via FNE (i.e., base station) 206.

Figure 11:
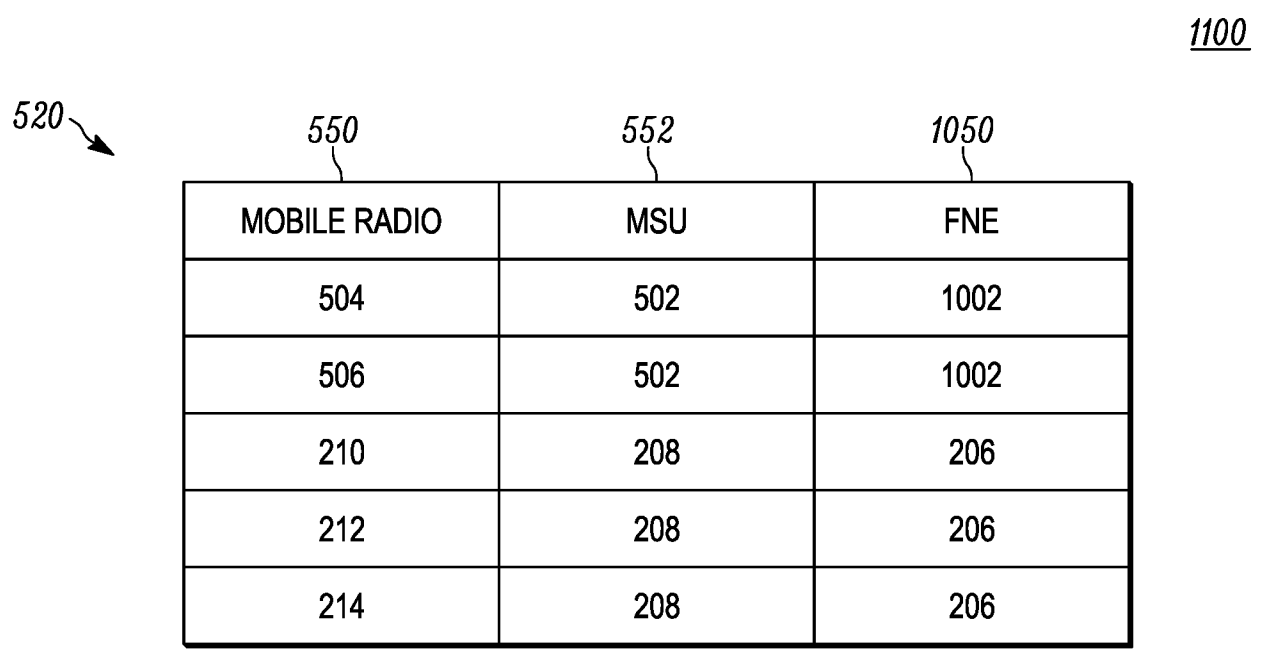

FIG. 11 depicts a sixth state 1100 of PMT 520 subsequent to RAN device 301 receiving the MSU-reregistration request from MSU 208. As shown, at state 1100, RAN device 301 has updated column 1050 of PMT 520 to indicate that mobile radio 210 is registered with RAN 102 via FNE (i.e., base station) 206, and has also updated column 1050 to indicate that mobile radios 212 and 214 are registered with RAN 102 via FNE (i.e., base station) 206 (subsequent to determining that PMT 520 had indicated that mobile radios 212-214 were also registered with RAN 102 via MSU 208).

Referring again to FIG. 4, at step 404, RAN device 301 receives a first service request for mobile radio 210 (that is listed in PMT 520 as being registered with RAN 102 via MSU 208). In response to receiving the first service request at step 404, RAN device 301 makes a determination at step 406 that air-interface link 220 is available for communication between RAN 102 and MSU 208. In response to making the determination at step 406, RAN device 301 at step 408 communicates the first service request via air-interface link 220 to MSU 208 for delivery to mobile radio 210.

The service request may take the form of (or include), as examples, a request to establish a call with mobile radio 210 and/or a request to send a message (e.g., a Short Message Service (SMS) message and/or a Short Data Service (SDS) message) to mobile radio 210, among numerous other possibilities.

In at least one embodiment, receiving the first service request for mobile radio 210 that is listed in PMT 520 as being registered with RAN 102 via MSU 208 includes receiving the first service request for mobile radio 210 and responsively making a determination that mobile radio 210 is listed in PMT 520 as being registered with RAN 102 via MSU 208.

Making the determination at step 406—that air-interface link 220 is available for communication between RAN 102 and MSU 208—may include RAN device 301 making a determination that air-interface link 220 is established between RAN 102 and MSU 208. Additionally or alternatively, making this determination may include RAN device 301 making a determination that no mobile radios that are listed in PMT 520 as being registered with RAN 102 via MSU 208 are engaged in a call. As still another possibility, making the determination may include making a determination that MSU 208 is not engaged in a call. Those of skill in the art will appreciate that making the determination that air-interface link 220 is available for communication between RAN 102 and MSU 208 may include any combination of these and/or other possibilities.

RAN device 301 may receive a second service request for mobile radio 210 from a given network entity (such as another mobile radio that is registered with RAN 102). In response to receiving the second service request, RAN device 301 may make a determination that air-interface link 220 is not available for communication between RAN 102 and MSU 208, and may responsively send a rejection of the second service request to the given network entity.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method carried out by a radio access network (RAN) device in a RAN, the method comprising:
   maintaining, by the RAN device, a proxy mapping table (PMT) of any mobile radios that are currently registered with the RAN via a mobile subscriber unit (MSU), the PMT indicating, for each mobile radio listed in the PMT, the particular MSU via which that particular mobile radio is registered with the RAN;
   receiving, by the RAN device, a first service request for a first mobile radio that is listed in the PMT as being registered with the RAN via a first MSU;
   in response to receiving the first service request for the first mobile radio, making a determination, by the RAN device, that an air-interface link is available for communication between the RAN and the first MSU, wherein the step of making the determination comprises the steps of making a determination that no mobile radios that are listed in the PMT as being registered with the RAN via the first MSU are engaged in a call, and making a determination that the first MSU is not engaged in a call; and
   in response to making the determination, communicating, by the RAN device, the first service request via the available air-interface link to the first MSU for delivery to the first mobile radio.

2. The method of claim 1, wherein the RAN comprises an Association of Public-Safety Communications Officials-International (APCO) Project 25 (P25) network.

3. The method of claim 1, wherein maintaining the PMT comprises:
   receiving a radio-registration request from the first mobile radio via the first MSU, the radio-registration request indicating that the first mobile radio is attempting to register with the RAN via the first MSU; and
   in response to receiving the radio-registration request, registering the first mobile radio with the RAN at least in part by adding the first mobile radio to the PMT such that the PMT indicates that the first mobile radio is registered with the RAN via the first MSU.

4. The method of claim 3, wherein registering the first mobile radio with the RAN further comprises making a determination that the first MSU is registered with the RAN and responsively registering the first mobile radio with the RAN.

5. The method of claim 4, wherein:
   the radio-registration request includes a unique identifier of the first MSU, and
   making the determination that the first MSU is registered with the RAN comprises making a determination that the unique identifier of the first MSU is listed in at least one of a Home Location Register (HLR) and a Visitor Location Register (VLR).

6. The method of claim 3, wherein:
   the radio-registration request includes a unique identifier of the first mobile radio, and
   adding the first mobile radio to the PMT comprises making a determination that the unique identifier of the mobile radio is listed in at least one of a Home Location Register (HLR) and a Visitor Location Register (VLR) and responsively adding the unique identifier of the first mobile radio to the PMT.

7. The method of claim 1, wherein maintaining the PMT comprises:
   receiving a radio-deregistration request from the first MSU; and
   in response to receiving the radio-deregistration request from the first MSU, making a determination that the PMT indicates that the first mobile radio is registered with the RAN via the MSU and responsively removing the first mobile radio from the PMT.

8. The method of claim 1, wherein maintaining the PMT comprises:
   receiving a radio-deregistration request from the first mobile radio; and
   in response to receiving the radio-deregistration request from the first mobile radio, making a determination that the first mobile radio is listed in the PMT and responsively removing the first mobile radio from the PMT.

9. The method of claim 1, wherein:
   the PMT further indicates, for each mobile radio listed in the PMT, a particular fixed network entity (FNE) via which the particular MSU is registered with the RAN,
   the first MSU is initially registered with the RAN via a first FNE, and
   maintaining the PMT comprises:
      receiving an MSU-reregistration request from the first MSU, the MSU-reregistration request indicating that the first MSU is attempting to reregister with the RAN via a second FNE; and
      in response to receiving the MSU-reregistration request from the first MSU, making a determination that the PMT indicates that the first mobile radio is registered with the RAN via the first MSU and responsively updating the PMT to indicate that the first mobile radio is registered with the RAN via the second FNE.

10. The method of claim 1, wherein the service request comprises a request to establish a call with the first mobile radio.

11. The method of claim 1, wherein receiving the first service request for the first mobile radio that is listed in the PMT as being registered with the RAN via the first MSU comprises receiving the first service request for the first mobile radio and responsively making a determination that the first mobile radio is listed in the PMT as being registered with the RAN via the first MSU.

12. The method of claim 1, wherein making the determination that the air-interface link is available for communication between the RAN and the first MSU comprises making a determination that the air-interface link is established between the RAN and the first MSU.

13. The method of claim 1, further comprising:
receiving a second service request for the first mobile radio from a given network entity; and
in response to receiving the second service request, making the determination that the air-interface link is not available for communication between the RAN and the first MSU and responsively sending a rejection of the second service request to the given network entity.

14. The method of claim 1, wherein the air-interface link comprises a half-duplex link.

15. The method of claim 14, wherein the half-duplex link comprises a simplex link.

16. The method of claim 1, wherein the first MSU comprises a mobile radio.

17. The method of claim 1, wherein the first MSU comprises a repeater for facilitating communication between the first mobile radio and the RAN.

18. A radio access network (RAN) device in a RAN, the RAN device comprising:

a communication interface;

a processor; and data storage containing instructions executable by the processor for causing the RAN device to carry out a set of functions, the set of functions including:

maintaining a proxy mapping table (PMT) of any mobile radios that are currently registered with the RAN via a mobile subscriber unit (MSU), the PMT indicating, for each mobile radio listed in the PMT, the particular MSU via which that particular mobile radio is registered with the RAN;

receiving a first service request for a first mobile radio that is listed in the PMT as being registered with the RAN via a first MSU;

in response to receiving the first service request for the first mobile radio, making a determination that an air-interface link is available for communication between the RAN and the first MSU, wherein the step of making the determiniation comprises the step of:

making a determination that no mobile radios that are listed in the PMT as being registered with the RAN via the first MSU are engaged in a call, and making a determination that the first MSU is not engaged in a call; and in response to making the determination, communicating the first service request via the available air-interface link to the first MSU for delivery to the first mobile radio.

* * * * *